Patented Apr. 15, 1952

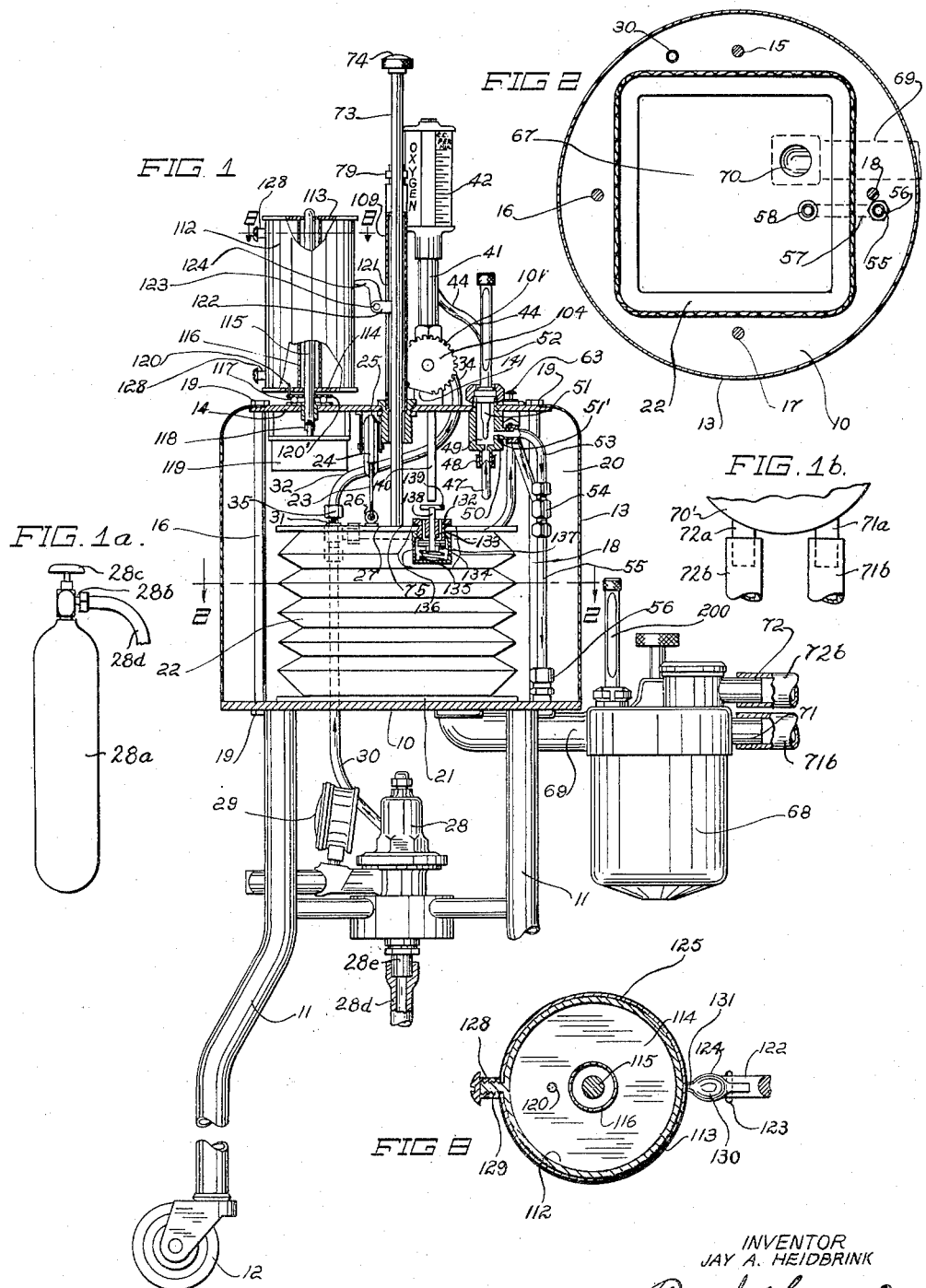

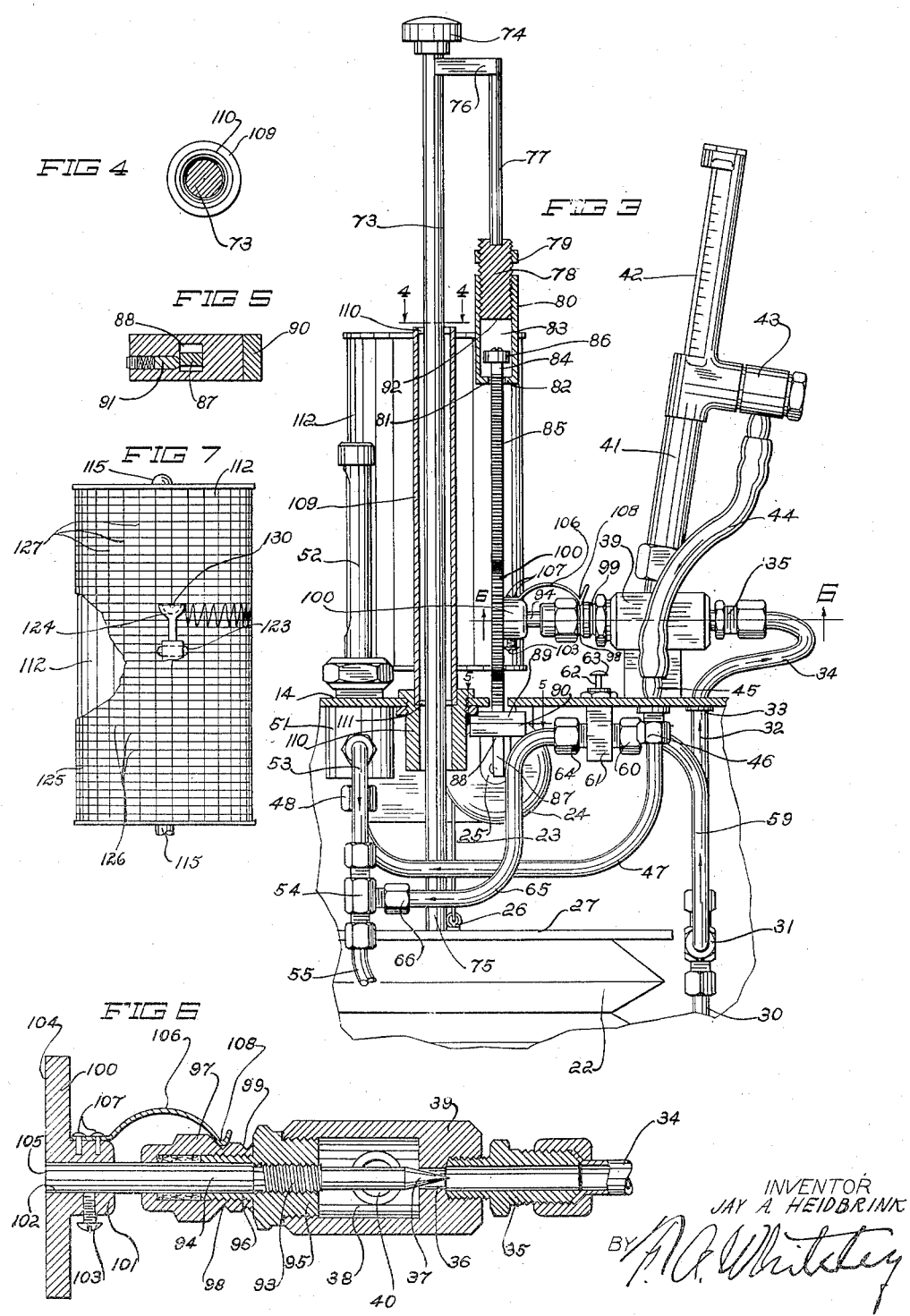

2,592,694

UNITED STATES PATENT OFFICE 2,592,694

METABOLISM APPARATUS FOR MEASURING OXYGEN CONSUMPTION DURING RESPIRATION

Jay A. Heidbrink, Minneapolis, Minn., assignor to Air Reduction Company, Incorporated, New York, N. Y., a corporation of New York Application September 3, 1946, Serial No. 694,527

13 Claims. (Cl. 128—2.07)

My invention relates to a metabolism apparatus and method for measuring oxygen consumption during respiration and has for its object to provide an apparatus wherein the consumption of oxygen by a patient is accurately determined by measuring the dry oxygen as it comes from the tank and before it has gone to the lungs of the patient or through absorber mechanism or otherwise has been subject to water absorption, change of temperature or other variable conditions.

The making of metabolism tests is standard medical practice, upon which, under certain conditions, both diagnosis and treatment of a patient may depend.

The practice heretofore has been to employ a closed breathing line embodying an absorber for removing carbon dioxide and an expansible reservoir of some type into which and from which the patient breathes. Exhalation goes through the absorber and the customary soda lime therein will remove an indeterminate amount of moisture from the exhalation gases.

In this method the consumption of oxygen is determined from the depletion of the contents of the expansible member over a stated period of time, and the measurement of this oxygen involves uncertainties due to the undeterminable amount of moisture in the expansible member and variations in temperature and the like. Hence the readings of depletion of oxygen over a period of time from the expansible reservoir require corrections for moisture content and temperature of the gas therein.

There exists no means practically usable in connection with this practice of making metabolism tests for accurately determining the humidity of the gas within the expansible container. Furthermore, the temperature correction where the gas carries body heat also is a matter difficult to make with a sufficient degree of certainty.

I have discovered a means of overcoming these difficulties and of correcting these uncertainties in metabolism tests by effecting measurement of the oxygen consumed by the subject as that oxygen comes in the dry state from the oxygen tank and while its temperature will remain substantially constant at the normal room temperature in which the test takes place.

The means for affecting these measurements includes a closed breathing circuit with a soda lime carbon dioxide absorber chamber in said breathing line, a bellows reservoir from which the patient inhales and to which the patient exhales, and means for delivering oxygen to the bellows member, wherein the oxygen is routed through a flow meter and the amount of oxygen being delivered, as it comes directly from the oxygen tank and before it has been mixed with the breathing and rebreathing gases, is accurately and correctly measured.

I further discovered a means of recording the rise and fall of the bellows member during exhalation and inhalation respectively, which, in conjunction with the feed of oxygen going to the patient, can be adjusted to produce a normal balanced record such as to assure that the measurement of oxygen by the flow meter will be an accurate measurement of the actual amount of oxygen consumed by the subject upon whom the test is being made.

It is, therefore, a principal object of my invention to provide metabolism apparatus through which a closed breathing line is established, with an expansible bellows member forming a breathing and rebreathing reservoir, and to deliver the oxygen from a tank directly to said reservoir, and to provide means in the passages for delivering the oxygen which will measure the amount of said oxygen so delivered from the oxygen tank in its dry state.

It is a further object of my invention to provide in the closed breathing line a carbon dioxide absorber chamber of standard construction which will withdraw from the gases of exhalation circulating in said breathing line all carbon dioxide formed in the breathing operation, and to deliver the dry oxygen directly to the expansible breathing and rebreathing reservoir.

It is a further object of my invention to provide a constantly rotating cylindrical record sheet, and to provide means connected with the bellows breathing and re-breathing reservoir which will make a record on said sheet of the rise and fall of the bellows member reservoir during respiration and to provide adjustments whereby the record of that rise and fall on the record sheet will be constant so the record will come between parallel circumferential lines on the sheet.

It is a further object of my invention to provide a flow meter and to conduct oxygen from the tank through the flow meter and to introduce it directly through the fixed bottom wall of the expansible chamber to the interior of said chamber, and thus to provide for determining by readings on the flow meter the actual volume of oxygen absorbed by the subject.

It is a further object of my invention to provide means for regulating the flow of oxygen to and through the flow meter, which means may be automatically controlled by the rise and fall of the top of the expansible breathing and re-breathing reservoir.

It is a further object of my invention to provide means for adjusting the last-named means such that the breathing of any patient as indicated on the rotating drum will be related to the rise and fall of the top of the expansible breathing and re-breathing reservoir, whereby the amount of oxygen shown as passing through the flow meter will measure the actual amount of oxygen consumed by the patient or subject.

It is a further object of my invention to provide means for by-passing the flow meter and oxygen controlling means thereto to permit flow of oxygen directly into the re-breathing reservoir in advance of making the metabolism test employing that reservoir.

It is a further object of my invention to provide safety escape valve means such that if the reservoir for any reason becomes filled beyond a working capacity, the oxygen gas therein will escape to atmosphere.

The full objects and advantages of my invention will hereinafter be made to appear in the following specification, and the novel features by means of which the aforementioned useful and important advantages are secured will be particularly pointed out in the claims.

In the drawings illustrating an application of my invention in one of its forms:

Fig. 1 is a front elevation view of the invention with some of the parts broken away and taken in vertical section.

Fig. 1a is an elevation view of a container of compressed gas such as oxygen indicating the manner of its connection with the machine.

Fig. 1b is a side elevation view of a conventional mask of common construction indicating its manner of connection with the machine.

Fig. 2 is a sectional plan view taken on line 2—2 of Fig. 1 and viewed in the direction of the arrows.

Fig. 3 is a part sectional side elevation view of the upper portion of the apparatus viewed from the right-hand side of Fig. 1.

Fig. 4 is a sectional plan view taken on line 4—4 of Fig. 3, viewed in the direction of the arrows.

Fig. 5 is a sectional view taken on line 5—5 of Fig. 3 viewed in the direction of the arrows.

Fig. 6 is an enlarged sectional plan view taken on line 6—6 of Fig. 3.

Fig. 7 illustrates in detail the recording drum.

Fig. 8 is a top plan view on an enlarged scale of the pen member used to make a record of respiration of the subject being given a metabolism test, with drum and paper on line 8—8 of Fig. 1.

As illustrated, a main frame plate 10 is supported by sets of legs 11 mounted upon casters 12 in a customary manner. A circular cap piece 13 is supported upon plate 10, which also is circular, the cap piece having union with a top plate 14. The assemblage is held together by a series of bolts 15, 16, 17 and 18 which run through the bottom plate and the top plate 14 and are secured by nuts 19. The bottom and top plates 10 and 14 and the enclosed casing wall 13, together, form a closed chamber 20. Within the chamber 20 and resting upon a bottom plate 21 which in turn rests upon and is secured to the bottom wall 10 is a bellows member 22, preferably square in cross-section, which is adapted to rise and fall within the chamber 20 in response to exhalation and inhalation respectively of the patient. The weight of the bellows top and parts connected therewith is counterbalanced by a spring member 23 housed in a casing 24 which is suspended by bracket arms 25 from top plate 14, thus eliminating variations in pressure within the bellows member 22 at exhalation and inhalation respectively, and so preventing inaccuracy from this cause.

The spring member 23 is connected with a loop 26 secured to the top 27 of bellows member 22.

Oxygen is delivered from a standard tank of oxygen 28a maintained under pressure within the tank through a pressure reducing valve 28, Fig. 1. A gauge 29 of well known construction indicates the tank pressure of the gas. The gas from the tank is delivered through a customary nipple extension 28b and its flow is controlled by valve 28c. From the nipple 28b a tube 28d goes to a nipple 28e leading to the pressure reducing valve 28.

From the reducing valve 28 the gas goes through a tube 30 to a T-union 31, thence, in its normal passage when the machine is in operation, through a tube 32 which, as indicated at 33 in Fig. 3, continues through a tube 34 and a connector member 35 to a needle valve opening 36, Fig. 6, and past the needle valve 37 which controls the needle-valve-opening into a chamber 38 within a distributor block 39.

From the chamber 38 the gas goes through an opening 40, to and through a flow valve 41 of well known construction, not shown in detail, and which flow valve has a customary scale 42 which cooperates with an indicator (not shown) in the flow valve for designating the flow of oxygen gas in c. c. per minute.

The oxygen gas leaves the flow valve 41 through a ported extension 43, Fig. 3, from which it travels through a flexible hose 44 to a nipple 45 secured to top plate 14.

From the nipple 45 the gas passes through a connector member 46. From the connector member 46 a pipe or tube 47 leads to a connector 48 which opens into a thermometer chamber 49, Fig. 1, in a connecting section 50. In the chamber 49 is located a thermometer bulb 51 of a thermometer 52, as shown in Fig. 1.

Through an opening 51' in section 50 to chamber 49 a pipe or tube 53 leads through a T-connector 54 and to a pipe 55, which goes to a connector 56, Figs. 1 and 2. The connector 56 goes through bottom plate 10 to a branch pipe shown in dotted lines at 57 in Fig. 2, from which it opens upwardly through bottom plate 10 at 58, Fig. 2, on the inside of bellows member 22.

This is the normal course of travel of the oxygen gas to reach the breathing and re-breathing reservoir within bellows member 22, and it will be noted that throughout that course of travel, which takes it through the flow meter 41, where the flow in c. c. per minute is measured, through the thermometer chamber 49 and into the re-breathing reservoir itself, it travels unchanged and directly from the oxygen tank, and entirely unaffected by respiration.

As used, such oxygen tank normally will have its contents at room temperature, and hence that temperature cannot be changed by the passage through the parts designated, all of which are subject to room temperature, and that temperature will be shown by the thermometer 52.

At the start of a metabolism test it will be desirable to have the bellows member quickly filled to lift its top 27 and the parts carried thereby to a desired height for containing a suitable amount of oxygen to be breathed and re-breathed. For this purpose I provide an oxygen passageway from T-union 31 through pipe or tube 59, Fig. 3.

Pipe 59 goes through a connector 60 and into a valve box 61 which is normally held closed by a spring valve, not shown. The spring valve is, however, simply operated by a thrust lever 62 which has on its top a head 63 adapted to be contacted by a thumb or finger.

When the head is pushed down the gas takes the route of least resistance and goes through a connector 64 to a pipe or tube 65, from which it goes through a connector 66 and thence through T-connector 54 to the pipe 55, which latter, as heretofore described, connects through opening 58 with the interior of bellows member 22 providing the breathing and re-breathing reservoir therein. It follows that whenever the thrust lever 62 is depressed through a finger contact with head 63 the oxygen gas will by-pass the flow valve mechanism and go directly to the breathing and re-breathing reservoir 67 within bellows member 22.

A standard soda lime carbon dioxide absorber is shown at 68 in Fig. 1. This connects through a pipe 69, indicated in full lines in Fig. 1 and in dotted lines in Fig. 2, then goes through a discharge opening 70, Fig. 2, into chamber 67 within the bellows member 22.

The exhalation outlet from the mask 70' goes through a nipple 71a from said mask and a tube 71b to the nipple 71 from which it goes through to soda lime container 68, the pipe 69 and opening 70 into breathing reservoir 67, as shown in Figs. 1 and 1b.

As similarly shown, the gases of inhalation are drawn into the mask through a nipple 72a thereon, tube 72b and nipple 72 through pipe 69 and opening 70 into breathing reservoir 67, thus completing the closed breathing circuit.

In this circuit the carbon dioxide carried in the exhalation gases is wholly removed in the absorber 68, so the breathing and re-breathing reservoir 67, initially filled with oxygen, at all times contains, other than breath moisture not absorbed by the soda lime, only oxygen, including that which is supplied to take the place of the oxygen of the removed carbon dioxide, and which is introduced into the re-breathing chamber at its bottom entirely unchanged at the substantially dry humidity and the room temperature of the oxygen in the tank.

Automatic means for controlling the flow of oxygen through the flow valve and to the reservoir breathing and re-breathing bag, comprises an upstanding rod 73 which is provided with a top knob 74 and is secured at its bottom 75 to the top plate 27 of the reservoir bellows 22. This rod, therefore, rises and falls with the top of the bellows in response to exhalation and inhalation into the reservoir chamber 67.

Secured to the rod 73 just below the knob 74 is an arm 76 to which is secured a vertical rod 77 that in turn is secured to a threaded plug 78 having thereon a nut member 79.

Adjustably held upon the threaded plug 78 is a cup-like member 80 which has a central opening 81 in its bottom wall 82, and which with that bottom wall encloses a chamber 83 below the threaded block 78. By turning the sleeve 80 the chamber 83 may be made either longer or shorter as desired, and locked by nut 79.

The end 84 of an elongated rack bar 85 extends into the chamber 83, and it has thereon a removable head 86. The chamber 83 is adjusted to be slightly longer than the complete up and down movement of the head 86 therein, so when the device is operating for normal breathing the head 86 will not contact the bottom wall 82 or the top wall 92 of chamber 83. The rack has an extension 87 at its bottom which moves through an opening 88 in a piece 89 that is secured to a bracket 90 in turn secured to the top plate 14.

A spring-actuated friction piece 91, Fig. 5, engages the extension 87 of rack bar 85 with a yielding pressure, which holds it in fixed position, except as the head 86 in chamber 83 may be engaged by the bottom wall 82 or the end wall 92 of block 78 forming the respective top and bottom walls of chamber 83.

Referring to Figs. 3 and 6, the needle valve 37 has a threaded portion 93 on valve stem 94 which is threaded into a closure nut 95 screwed into the end of distributor block 39, which with nut 95 encloses chamber 38.

The closure nut 95 has on it an externally threaded extension 96 upon which is threaded a packing nut 97, which also is provided with a pair of external circular guide grooves 98 and 99. A pinion 100 has thereon a hub 101 and a central opening 102 surrounding the valve stem 94 and adapted to be secured thereto by set screw 103.

When the face 104 of the pinion 100 is flush with the end 105 of the valve stem 98 the pinion will be held in mesh with the rack 85 as clearly shown in Fig. 3. At that time a spring member 106 secured to hub 101 by screws 107 will have its turned up detent portion 108 set in groove 98, and the spring member will ride in that groove if and when the rack is reciprocated back and forth and thereby is caused to turn to a desired degree the pinion 100 and valve stem 98 first in one direction, then in the other.

Another safety device is provided in connection with the automatic control of oxygen gas being delivered to the flow valve. For this purpose the pinion 100 is provided with a flat side 141. The adjustment of the valve in relation to the rotation of pinion 100 is such that when the valve is fully and firmly closed the flat side will come opposite the teeth of rack 85 and disconnect the rack from the pinion, thus providing against excessive strains or injury to the valve mechanism, which might happen if under such circumstances the rack continued to be connected, since the air pressure on the rack and pinion could become very great because of the large area of top 27 of bellows member 22 subject to air pressure when the gas is withdrawn from the chamber 67 therein.

Referring again to the rod 73 fast at its lower end on top plate 27 of bellows member 22, as shown in Fig. 3, this rod 73 operates within a tube 109 supported on top plate 14. This tube is supplied with a guide washer 110 pressed into the top of the tube and surrounding the rod 73 with a free fit. A washer 111 is pressed into the bottom of tube 109, Fig. 3, which tube is supported in a circular socket at the top of a tubular piece 110 rigidly supported on top plate 14. This arrangement permits ready movement up and down of the rod 73 within the guide washers 110 and 111.

The arrangement of the rack 85 is such that its head 86 will normally move in chamber 83 so as not to contact bottom wall 81 or top wall 92 of chamber 83, as it is oscillated by the rod 73 and connecting rod 77, and it is the purpose of this part of my invention to eliminate automatic operation of the valve through the rack bar 85 and the pinion 100 during normal breathing.

To effect this the pinion 100 is disconnected from the rack bar 85 by lifting the spring detent 106 and sliding the hub 101 on shaft 94, Fig. 6, so as to bring the detent 108 into annular groove 99.

The patient is then put in breathing connection with the breathing reservoir 67 in bellows member 22 and by means of the pinion 100 which is connected to rotate the shaft 94, the valve 37 is adjusted until a constant flow of oxygen of say 350 c. c. per minute is shown on the flow valve 42. Breathing is also continued until thermometer 200, Fig. 1, registers a stable and fixed temperature of the inhalation gases coming from the breathing chamber 67. Thermometer 200 does this because its bulb communicates with the passageways leading through tube 69 and opening 70 into the breathing chamber.

By the time the temperature indicated by thermometer 200 has become stable the moisture content within the chamber 67 resulting from the introduction of moisture of inhalation gases which is not removed within the absorber will also have become stable.

The apparatus is then in condition for effecting measurement of the oxygen consumed by the patient. To do this the pinion 100 is slid back to mesh with the rack 85. If the head 86 on said rack contacts either the top wall 92 or bottom wall 81 of chamber 83, this will move the valve 37 one way or another, adjusting the flow of oxygen to be read on the flow valve until such flow becomes constant, as indicated by lines recorded on the lined recording drum hereafter described in detail. The reading on the flow valve will then show the actual consumption of oxygen per minute in cubic centimeters.

As best shown in Figs. 1 and 7, the drum 112 has its top 113 and bottom 114 mounted upon a central shaft member 115 which extends through a sleeve 116 that goes centrally through the drum member. The drum rests upon a ball bearing 117 supported on top plate 14, and the central shaft 115 extends through the bottom of the drum and the top wall 14 and is connected at its bottom with a motor shaft 118 adapted to be operated by a timing motor indicated schematically at 119.

The drum 112 may be formed of any light material, preferably aluminum, and is removably supported upon the upstanding shaft 115, and is held to rotate with that shaft by a pin 120 fast on the plate 120' which forms the upper member of the roller bearing 117 and which is fast on shaft 110.

In this manner the drum is slowly rotated through a complete revolution in a period of time definitely fixed by the timing motor 119, which for a convenient form of test may be 15 minutes. The timing motor 119 may be a spring motor or an electric motor, all of well known construction, which do not need to be herein specifically described.

The drum may be formed of any suitable material such as aluminum, plastic or the like, and has its body in the form of a cylinder. Upon this cylinder is positioned a heavy paper sheet 125 which, as shown in Fig. 7, may have a series of equally spaced circumferential lines 126 upon it and also equally spaced vertical lines 127.

A fresh sheet 125 will be used for each test and these sheets are held in position by clamping members 128 which may be threaded upon studs 129 fast on the walls of the drum 112, Fig. 8.

The details of the pen 124 are shown in Fig. 8. These comprise an open-topped spoon-like depression 130 adapted to receive a small amount of ink placed there by a dropper. From depression 130 extends a pen point 131, which extends to contact lightly the surface of the sheet 125, being held there by the gravity swing of the pen body 124 upon its pivot member 123.

In order to insure that the bellows reservoir 22 shall not be overfilled and for that reason have its top 27 lifted too high, I provide a safety valve construction shown in detail in Fig. 1.

This safety valve construction comprises a block 132 which is mounted upon the top plate 27 of the bellows member 22. This is provided with valve openings 133 and a valve disk and seat 134, the disk being held in contact with the seat by a spring 135 which is seated in valve chamber 136, and which has openings 137 to the reservoir chamber 67.

The valve disk 134 is fast on a pin 138 and has a head 139 which is adapted to engage the end of a pin 140, rigidly connected at its upper end to the top plate 14.

It follows that when the top plate 127 of bellows member 22 rises to bring the head 139 on valve stem 138 into engagement with the lower end of pin 140, the valve disk 134 will be unseated and oxygen will escape to atmosphere to drop the top 27 of bellows 22 to its normal operating position.

In operation for making a metabolism test, the reservoir chamber 67 will quickly be filled to bring the top 27 to a proper level, by pushing down on the push valve 63.

As heretofore set forth, the subject will breathe for a short time with the spring detent 108 removed from the groove 98 to the groove 99 until temperature and moisture conditions are stabilized and an adjusted volume of gas is being supplied at a pre-determined rate of say 350 c. c. per minute. Further automatic adjustments by meshing the rack 85 with the pinion 100 will be made until the rise and fall of the top 27 of the bellows reservoir 22 becomes constant so the pen point 131 makes a series of uniform up and down record lines extending substantially between a given pair of circumferential lines 126 on the sheet 125.

The motor 90 is then started and slowly turns the drum 112 while the pen point 131 makes a series of up and down marks on the sheet 125, which will have their respective apices in parallel lines. From the flow meter can then be read the cubic centimeters of oxygen per minute being consumed or absorbed by the subject, and at the end of the period of test, for practical purposes usually fifteen minutes, the flow per minute indicated by the flow meter will be multiplied by fifteen and will give the actual consumption or absorption of oxygen of the subject for the period.

The primary advantage of this determination resides in the fact that the measurement of the oxygen is made while it is dry and at room temperature, and practically, under normal conditions, it will require none of the difficult and uncertain calculations for temperature, moisture content and the like which now prevails in metabolism tests and render them distinctly uncertain as to final accuracy.

I claim:

1. Metabolism apparatus comprising an expansible breathing reservoir, a container of dry oxygen maintained under pressure at room temperature, an absorber for carbon dioxide, a mask and connections to the reservoir for establishing a closed breathing line, only the exhalation side of said breathing line going through the absorber, means for delivering directly into the reservoir wholly outside of the breathing line except as such enters and leaves the reservoir dry oxygen gas from said container at a temperature unchanged by the breathing action, a drum and recording sheet thereon and a timing device for driving it, a pen member mounted to rise and fall with the top of the reservoir and positioned to record said rise and fall upon the record sheet, means for adjusting the flow of oxygen to the reservoir effected by the procurement of an evenly balanced record along the record sheet, and means for measuring the adjusted amount of oxygen delivered to the reservoir and absorbed by the subject.

2. In metabolism apparatus, including an expansible breathing reservoir, an absorber for carbon dioxide and means forming a closed breathing line for carrying exhalation through the absorber to and inhalation from the reservoir, a container of dry oxygen and means for delivering the oxygen directly from the container to the reservoir, a drum and recording sheet thereon, and a timing device for driving it, a pen member mounted to rise and fall with the top of the reservoir and positioned to record said rise and fall upon the record sheet, means for adjusting the flow of oxygen to the reservoir effected by the procurement of an evenly balanced record along the record sheet, and means for measuring the adjusted amount of oxygen delivered to the reservoir and absorbed by the subject.

3. In metabolism apparatus, including an expansible breathing reservoir, an absorber for carbon dioxide and means forming a closed breathing line for carrying exhalation through the absorber to and inhalation from the reservoir, a container of dry oxygen and means for delivering the oxygen directly from the container to the reservoir, a drum and recording sheet thereon, and a timing device for driving it, a pen member mounted to rise and fall with the top of the reservoir and positioned to record said rise and fall upon the record sheet, means for adjusting the flow of oxygen to the reservoir effected by the procurement of an evenly balanced record along the record sheet, and a flow valve in the oxygen delivering means for indicating the adjusted flow per minute of oxygen to determine the amount thereof delivered to the reservoir and absorbed by the subject.

4. In metabolism apparatus, including an expansible breathing reservoir, an absorber for carbon dioxide and means forming a closed breathing line for carrying exhalation through the absorber to and inhalation from the reservoir, a container of dry oxygen and means for delivering the oxygen directly from the container to the reservoir, a flow valve in said delivery means, a needle valve controlling delivery of oxygen from the container to the flow valve, and means operated by the rise and fall of the top of the container due to respiration for operating the needle valve to increase flow of oxygen to the reservoir upon inhalation of the subject in an amount determined by the depth of said inhalation.

5. In metabolism apparatus, including an expansible breathing reservoir, an absorber for carbon dioxide and means forming a closed breathing line for carrying exhalation through the absorber to and inhalation from the reservoir, a container of dry oxygen and means for delivering the oxygen directly from the container to the reservoir, a flow valve in said delivery means, a needle valve controlling delivery of oxygen from the container to the flow valve, a pinion on the needle valve, a rack connected with the top of the reservoir to be moved up and down by the respiration of a subject, said rack meshing with the pinion and operating the needle valve thereby to increase flow of oxygen to the reservoir upon inhalation of the subject in an amount determined by the depth of said inhalation.

6. Metabolism apparatus, comprising a fixed casing forming a closed chamber with top and bottom walls, an expansible breathing reservoir in the chamber having a bottom wall formed in part of the bottom wall of the casing, an absorber for carbon dioxide, a mask and a connection to the reservoir through said bottom wall for establishing a closed breathing line including the reservoir and the absorber, only the exhalation side of said breathing line going through the absorber, a container of dry oxygen maintained under pressure at room temperature, and means for delivering oxygen therefrom directly into the reservoir wholly outside the breathing line except as said dry oxygen enters and leaves the reservoir which is at a temperature unchanged by the breathing action.

7. Metabolism apparatus, comprising a fixed casing forming a closed chamber with top and bottom walls, an expansible breathing reservoir in the chamber having a bottom wall formed in part of the bottom wall of the casing, an absorber for carbon dioxide, a mask and a connection to the reservoir through said bottom wall for establishing a closed breathing line including the reservoir and the absorber, only the exhalation side of said breathing line going through the absorber, a container of dry oxygen maintained under pressure at room temperature, means for delivering oxygen therefrom directly into the reservoir wholly outside the breathing line except as said dry oxygen enters and leaves the reservoir which is at a temperature unchanged by the breathing action, and a flow valve in said delivering means through which the oxygen passes in going to the reservoir, said flow valve measuring and indicating the amount of oxygen in liters per minute absorbed by the subject.

8. Metabolism apparatus, comprising a fixed casing forming a closed chamber with top and bottom walls, an expansible breathing reservoir in the chamber having a bottom wall formed in part of the bottom wall of the casing, an absorber for carbon dioxide, a mask and a connection to the reservoir through said bottom wall for establishing a closed breathing line including the reservoir and the absorber, only the exhalation side of said breathing line going through the absorber, a container of dry oxygen maintained under pressure at room temperature, means for delivering oxygen therefrom directly into the reservoir wholly outside the breathing line except as said dry oxygen enters and leaves the reservoir which is at a temperature unchanged by the breathing action, means for adjusting the flow of oxygen to the reservoir to accord with the absorption of oxygen by the subject in breathing, and a flow valve in said delivering means through which the oxygen passes in going to the reservoir, said flow valve measuring and indicating the amount of oxygen in liters per minute absorbed by the subject.

9. In a metabolism apparatus, an expansible reservoir, a mask, a branched conduit connecting the mask and the reservoir to form a closed breathing circuit, a carbon dioxide absorber in a portion of said conduit, a source of dry oxygen, delivering means responsive to the movement of the reservoir effected by the breathing of the patient connected to the source of oxygen for delivering oxygen in volume substantially equal to the volume consumed by the patient, and a second conduit extending between the delivering means and the reservoir and connected to the latter at a point which is remote from the connection of the first named conduit with the reservoir for introducing the delivered oxygen into the reservoir unaffected by the conditions of the gas in the first named conduit.

10. In a metabolism apparatus for measuring the rate of oxygen consumption by a patient during respiration, a closed breathing circuit, an absorber for carbon dioxide and an expansible reservoir forming respective parts of said circuit, an outside source of oxygen, means responsive to movements of the expansible reservoir effected by the flow of gases in the closed breathing circuit for controllably delivering oxygen from said outside source into the breathing circuit at substantially the same rate at which it is absorbed to thereby maintain the oxygen content of the breathing circuit substantially constant, and means for measuring the rate of flow of the oxygen so introduced into the closed breathing circuit.

11. In a metabolism apparatus for measuring the oxygen consumption of a patient during respiration, a closed breathing circuit including a mask through which the patient breathes, a carbon dioxide absorber, a constant pressure expansible reservoir responsive to the volumetric displacement of the gases of respiration going thereinto and therefrom, an outside source of oxygen, adjustable means for introducing said oxygen at a controlled volume into the closed breathing circuit, means associated with said expansible reservoir responsive to changes in the total volume of gases entering the expansible reservoir for regulating said adjustable means to introduce sufficient oxygen to maintain the volume of gas moving through the circuit substantially constant, and means for measuring the flow of oxygen to the closed breathing circuit before its introduction thereinto.

12. In metabolism apparatus for measuring the rate of oxygen consumption of a patient during respiration, a closed breathing circuit, an absorber for carbon dioxide in the exhalation part of the circuit, said breathing circuit including a mask and an inhalation part and an exhalation part connected respectively on each side of the mask, an expansible reservoir in the inhalation part of said circuit, an outside source of oxygen connected to deliver oxygen into the inhalation part, means responsive to movements of the expansible reservoir effected by the flow of gases therethrough for controllably delivering oxygen from said outside source into the inhalation part of the breathing circuit at substantially the same rate at which it is absorbed, thereby to maintain the oxygen content of the inhalation part and exhalation part respectively substantially constant, and means for measuring the rate of flow of oxygen introduced into the inhalation part of the breathing circuit.

13. A metabolism apparatus for measuring the rate of oxygen consumption of a patient during respiration, comprising an absorber for carbon dioxide, a closed breathing circuit, an expansible reservoir in said circuit having one part rigidly held and another part movable in respect thereto in response to the breathing of the patient through the closed circuit, an outside source of oxygen, means to deliver the oxygen into the breathing line, a member fast on the movable part of the expansible reservoir, means operated by said member to control the means of delivering the oxygen until said delivery becomes constant at substantially the same rate at which it is absorbed, and means for measuring said constant rate of flow of oxygen.

JAY A. HEIDBRINK.

REFERENCES CITED

The following references are of record in the file of this patent:

UNITED STATES PATENTS

| Number | Name | Date |
|---|---|---|
| 1,863,929 | McKesson | June 21, 1932 |
| 2,221,482 | Jones | Nov. 12, 1940 |
| 2,354,452 | Foregger | July 25, 1944 |
| 2,390,236 | Boothby | Dec. 4, 1945 |